(12) United States Patent
Kobayashi (10) Patent No.: US 7,084,920 B2
(45) Date of Patent: Aug. 1, 2006

(54) IMAGE PICKUP APPARATUS

(75) Inventor: Ryuichi Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 757 days.

(21) Appl. No.: 10/161,861

(22) Filed: Jun. 4, 2002

(65) Prior Publication Data
US 2002/0191097 A1 Dec. 19, 2002

(30) Foreign Application Priority Data
Jun. 5, 2001 (JP) .............................. 2001-169508

(51) Int. Cl.
*H04N 5/222* (2006.01)
*G03B 13/02* (2006.01)
*G03B 9/35* (2006.01)

(52) U.S. Cl. .................. 348/333.09; 396/374; 396/492

(58) Field of Classification Search ................ 396/374, 396/492; 348/333.09
See application file for complete search history.

(56) References Cited

U.S. PATENT DOCUMENTS

| | | | | |
|---|---|---|---|---|
| 6,249,650 B1 * | 6/2001 | Iwamoto | ..................... | 396/271 |
| 6,259,863 B1 * | 7/2001 | Maruyama | ................... | 396/177 |
| 6,734,895 B1 * | 5/2004 | Uehara et al. | ................ | 348/79 |
| 2001/0017982 A1 * | 8/2001 | Aoyama | ..................... | 396/121 |
| 2001/0043809 A1 * | 11/2001 | Sato et al. | .................... | 396/52 |
| 2002/0006281 A1 * | 1/2002 | Owada | ........................ | 396/104 |
| 2002/0075394 A1 * | 6/2002 | Fuchimukai | ................. | 348/335 |
| 2002/0176708 A1 * | 11/2002 | Irie | .............................. | 396/51 |
| 2003/0179310 A1 * | 9/2003 | Irie | ............................. | 348/349 |
| 2004/0047625 A1 * | 3/2004 | Ito et al. | ..................... | 396/429 |
| 2004/0101299 A1 * | 5/2004 | Matsumoto et al. | ........ | 396/452 |
| 2005/0041137 A1 * | 2/2005 | Ezawa et al. | ............... | 348/362 |

FOREIGN PATENT DOCUMENTS

| | | |
|---|---|---|
| JP | 11-326992 | 11/1999 |
| JP | 2001-016485 | 1/2001 |

* cited by examiner

*Primary Examiner*—Ngoc-Yen Vu
*Assistant Examiner*—James M. Hannett
(74) *Attorney, Agent, or Firm*—Cowan, Liebowitz & Latman, P.C.

(57) ABSTRACT

In an image pickup apparatus comprising an optical finder for optically displaying an object image, an image pickup device for receiving the object image and converting it into an image signal for photographing, an electronic finder for displaying the object image received by the image pickup device on the basis of the image signal converted by the image pickup device, a focal plane shutter for shielding the image pickup device from light, and a beam guide device for guiding a beam from the object to the optical finder and the image pickup device, and a control method and a control program applied to the image pickup apparatus, the beam from the object guided by the beam guide device is changed over from the optical finder to the image pickup device and the focal plane shutter is rendered into its opened state so that before photographing, the image pickup device can receive the object image displayed by the electronic finder.

5 Claims, 8 Drawing Sheets

IMAGE PICKUP APPARATUS

BACKGROUND OF THE INVENTION

1. Field of the Invention

This invention relates to an image pickup apparatus for taking an image, and particularly to an image pickup apparatus having a focal plane shutter.

2. Related Background Art

A conventional single-lens reflex digital still camera can effect optical finder display for a user to effect photographing after having visually confirmed an object image through the intermediary of a mirror, a pentaprism or the like. This digital still camera, however, opens a focal plane shutter only for a shutter time for photographing an object on an image pickup device such as a CCD and therefore, cannot effect electronic finder display for continuously displaying an object image on a liquid crystal monitor.

So, there has been proposed a digital still camera which can effect electronic finder display at all times through a focal plane shutter (for example, Japanese Patent Application Laid-Open No. 11-326992). This digital still camera has structure in which a leading vane moved to a light-intercepting position only during photographing and a trailing vane running after it are disposed forwardly of an image pickup device to thereby open the shutter at all times.

However, the above-described digital still camera has suffered from the inconvenience that it can effect electronic finder display at all times, but cannot effect optical finder display.

Also, it is of special structure in which in order to effect electronic finder display, the leading vane is moved in the same direction as the trailing vane to thereby open the shutter and therefore, it has suffered from the inconvenience that the structure becomes complicated and bulky.

SUMMARY OF THE INVENTION

It is a first object of the present invention to provide an image pickup apparatus having a focal plane shutter which can effect optical finder display and electronic finder display, and a control method and a control program applied to this image pickup apparatus.

It is a second object of the present invention to provide an image pickup apparatus having a focal plane shutter which can effect electronic finder display without being made complicated and bulky in structure, and a control method and a control program applied to this image pickup apparatus.

In order to achieve the first object, one aspect of the present invention is an image pickup apparatus comprising an optical finder for optically displaying an object image, an image pickup device for receiving the object image and converting it into an image signal for photographing, an electronic finder for displaying the object image received by the image pickup device on the basis of the image signal converted by the image pickup device, a focal plane shutter for shielding the image pickup device from light, and a beam guide device for guiding a beam from the object to the optical finder and the image pickup device, and a control method and a control program applied to this image pickup apparatus, and wherein the beam from the object guided by the beam guide device is changed over from the optical finder to the image pickup device and also, the focal plane shutter is opened so that before photographing, the image pickup device can receive the object image displayed by the electronic finder.

In order to achieve the second object, another aspect of the present invention is an image pickup apparatus comprising an image pickup device for receiving an object image and converting it into an image signal for photographing, an electronic finder for displaying the object image received by the image pickup device on the basis of the image signal converted by the image pickup device, and a focal plane shutter for shielding the image pickup device from light, and a control method and a control program applied to this image pickup apparatus, and wherein the image pickup device is exposed to light by the leading curtain after running and the trailing curtain before running of the focal plane shutter so that before photographing, the image pickup device can receive the object image displayed by the electronic finder and also, when shift is to be made from a state in which the object image before photographing is being displayed by the electronic finder to the photographing operation state, the leading curtain is moved into its state before running to thereby shield the image pickup device from light, whereafter the leading curtain is run to thereby expose the image pickup device to light and the trailing curtain is run to thereby shield the image pickup device from light, thus performing the photographing operation.

Other aspects of the present invention will become apparent from the description of a preferred specific embodiment shown below.

DESCRIPTION OF THE PREFERRED EMBODIMENT

A preferred embodiment of the present invention will hereinafter be described in detail with reference to the drawings.

Figure 1:
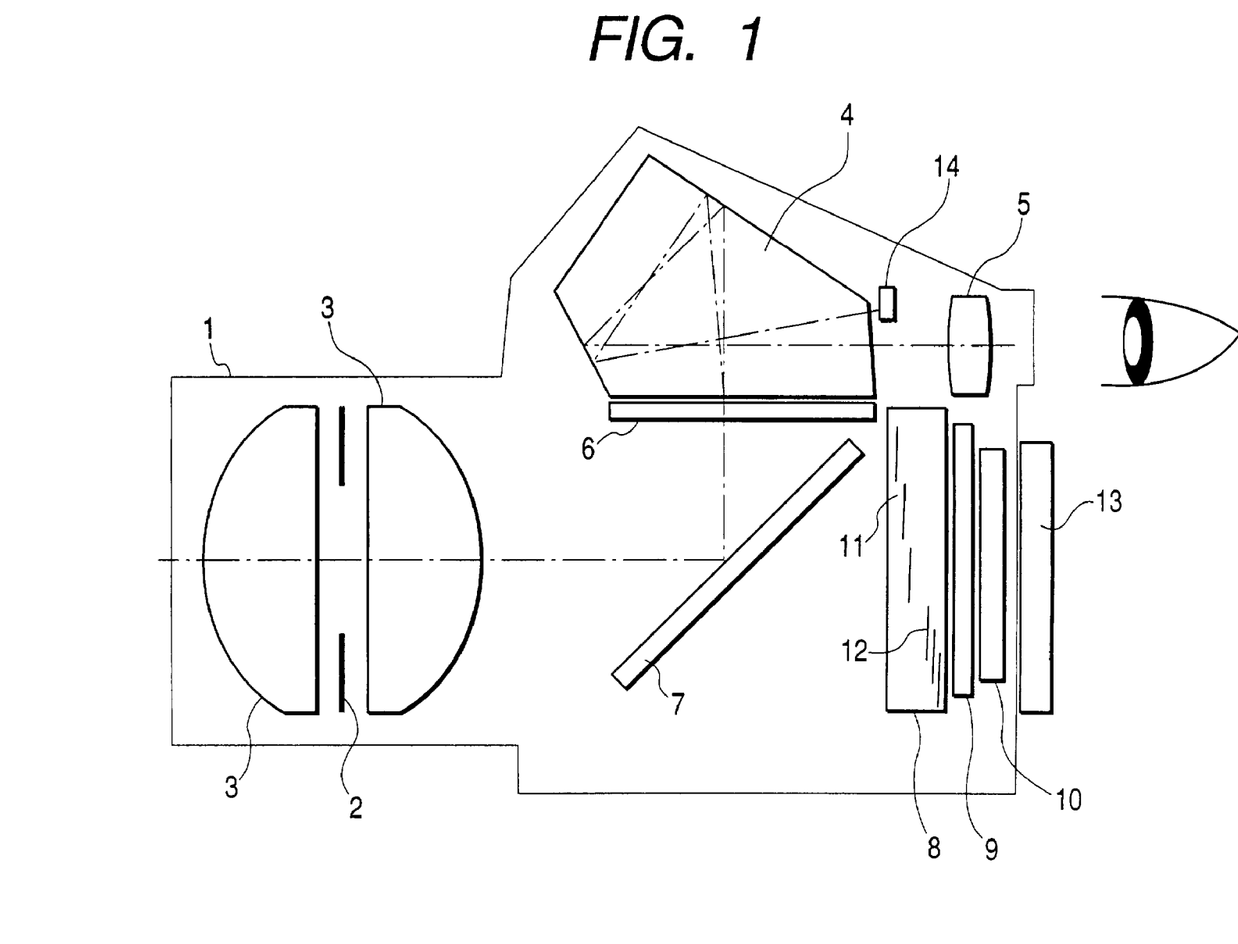
FIG. 1 is an illustration schematically showing the construction of a digital still camera according to an embodiment of the present invention, and shows the state of optical finder display.

FIG. 1 is a typical view schematically showing the construction of a digital still camera according to an embodiment of the present invention.

Referring to FIG. 1, the digital still camera according to the embodiment of the present invention has a main body 1. A pair of lenses 3 with a stop 2 interposed therebetween is disposed on the front face portion of the main body 1 of the camera. A pentaprism 4 and an eyepiece 5 (optical finder) are disposed on the eyepiece portion in the upper part of the main body 1 of the camera. A focusing plate 6 is disposed on the underside of the pentaprism 4, and below it, there is disposed a quick return mirror 7 (deflecting means) for reflecting light from an object passed through the lenses 3 to the pentaprism 4. This mirror 7 can be lifted up, and when lifted up, can pass therethrough the light from the object.

The shutter unit 8 of FIG. 5 which will be described later, a low-pass filter 9 and an image pickup device 10 such as a CCD are disposed on the back portion of the main body 1 of the camera, and the shutter unit 8 contains therein a focal plane shutter comprising a shutter leading curtain 11 and a shutter trailing curtain 12. A liquid crystal monitor 13 is also disposed on the back of the main body 1 of the camera.

In FIG. 1, the light from the object first enters through the front face portion of the main body 1 of the camera, and passes through the pair of lenses 3 with the stop 2 interposed therebetween and is focused, and is reflected by the mirror 7, and enters the pentaprism 4 after the object image is formed on the focusing plate 6. This light which has entered is visually confirmed as the object image by a user with the aid of the eyepiece 5. At this time, some of the light is scattered and enters a light measuring element 14. The light measuring element 14 detects the value of the luminosity of this scattered light as a voltage, and outputs the voltage and causes it to be converted into a digital signal.

The optical finder display mode will hereinafter be described with reference to FIGS. 1 to 3.

First, as shown in FIG. 1, the shutter leading curtain 11 of the shutter unit 8 is in its light-intercepting position and the shutter trailing curtain 12 is in its exposing position, and as previously described, optical finder display is effected.

Figure 2:
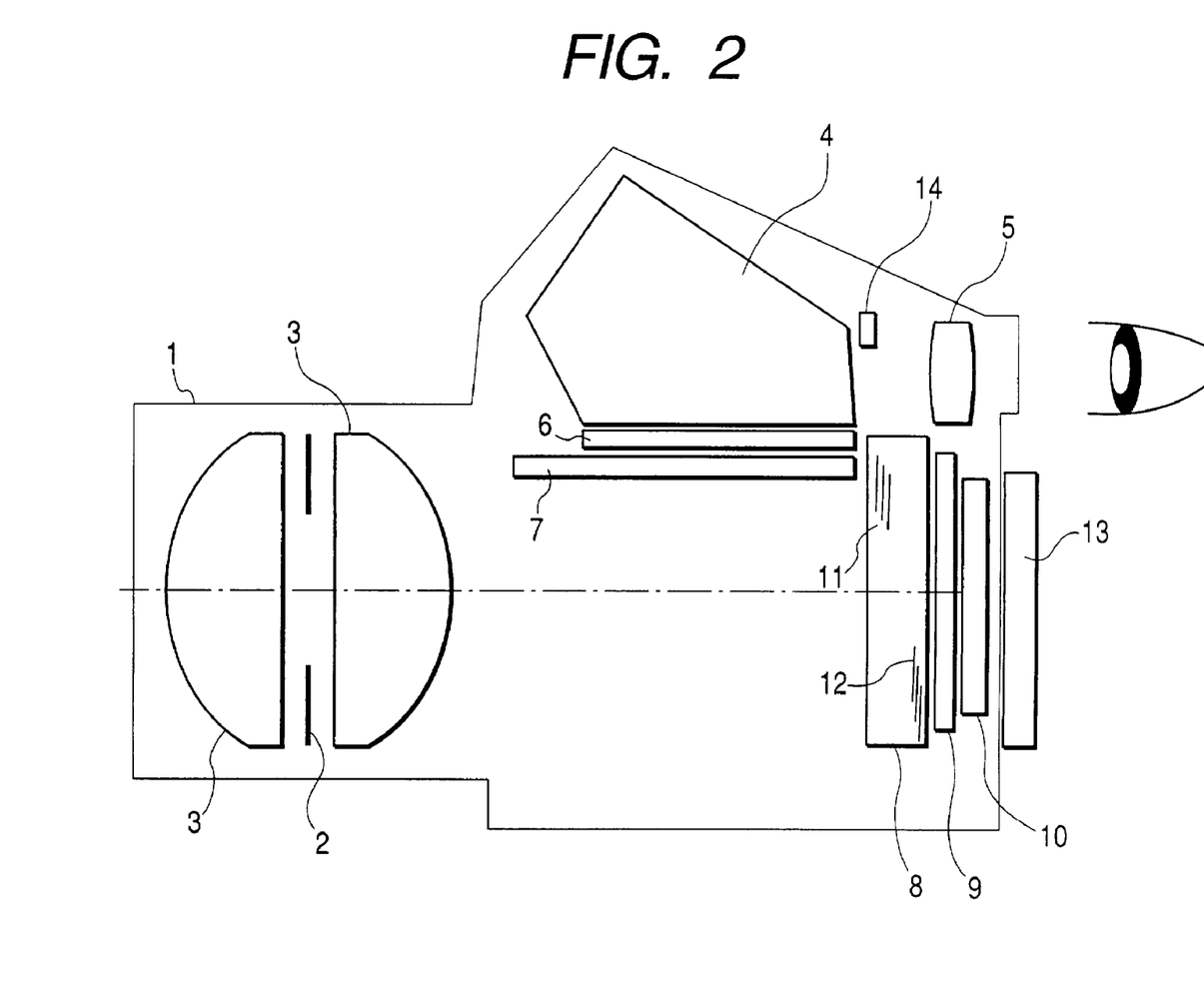
FIG. 2 is an illustration schematically showing the construction of the digital still camera of FIG. 1, and shows the case of image pickup in the optical finder display mode.

Then, as shown in FIG. 2, exposing run in which the shutter leading curtain 11 is moved from its light-intercepting position to its exposing position is effected to thereby pass the light from the object therethrough, and image pickup is effected by the image pickup device 10. After a shutter time, light-intercepting run in which the shutter trailing curtain 12 is moved from its exposing position to its light-intercepting position is effected, thus completing photographing (FIG. 3).

The electronic finder display mode will hereinafter be described with reference to FIG. 4.

Figure 4:
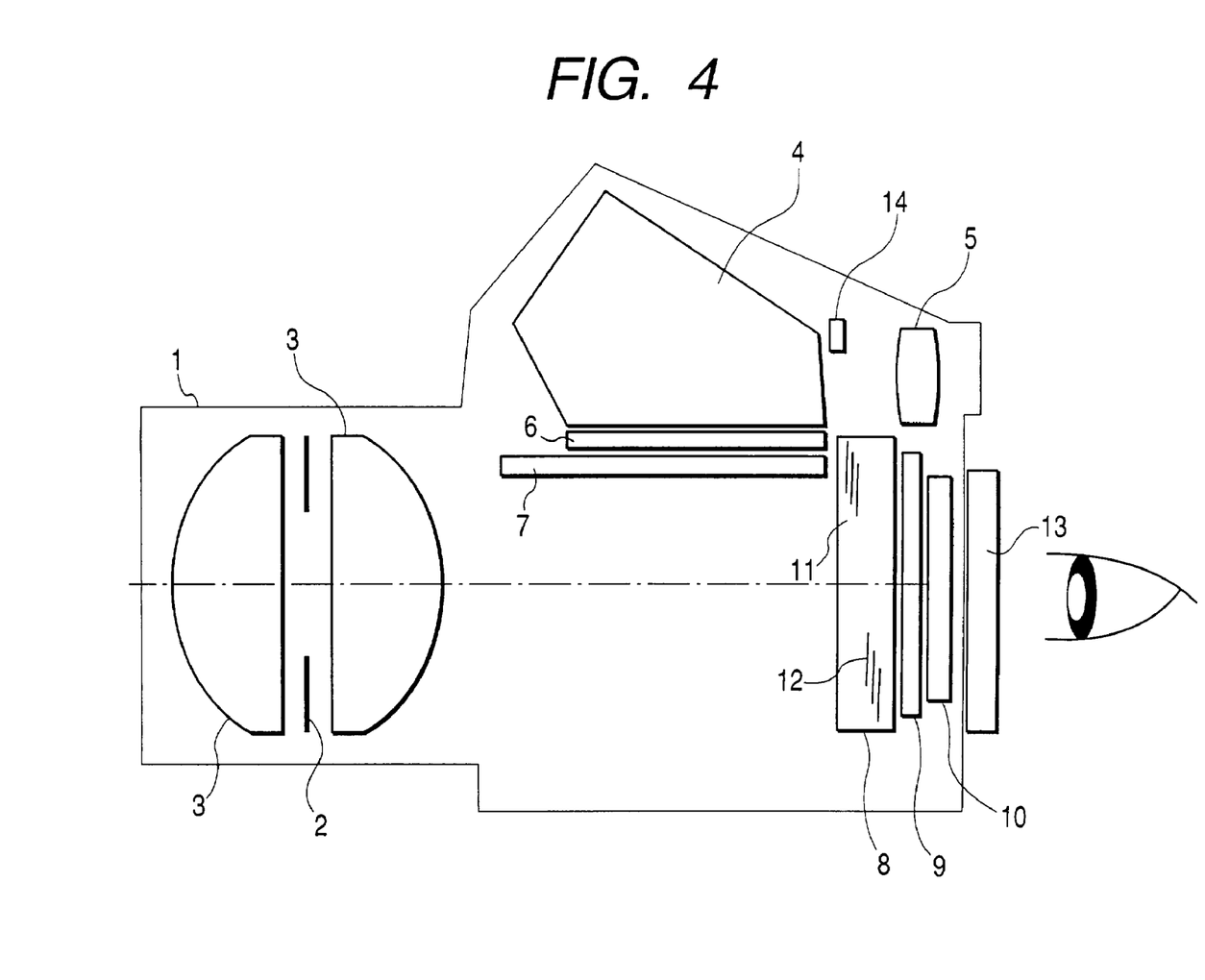
FIG. 4 is an illustration schematically showing the construction of the digital still camera of FIG. 1, and shows the case of image pickup in the electronic finder mode.

First, in FIG. 4, the mirror 7 is in its lifted-up position and the shutter leading curtain 11 and the shutter trailing curtain 12 are both in their exposing positions, and electronic finder display for effecting image pickup at all times is being effected. During photographing, light-intercepting charge in which the shutter leading curtain 11 is moved from its exposing position to its light-intercepting position is first effected, and the shutter leading curtain 11 again runs for exposure, and then, after the shutter time, the shutter trailing curtain 12 runs for light interception, thus completing photographing. Then, exposure charge in which the shutter trailing curtain 12 alone is moved from its light-intercepting position to its exposing position is effected to effect image pickup at all times.

The running/charging operations of the shutter leading curtain 11 and the shutter trailing curtain 12 as described above are performed by an operating mechanism (operating means) provided in the shutter unit 8 which will hereinafter be described.

Figure 5:
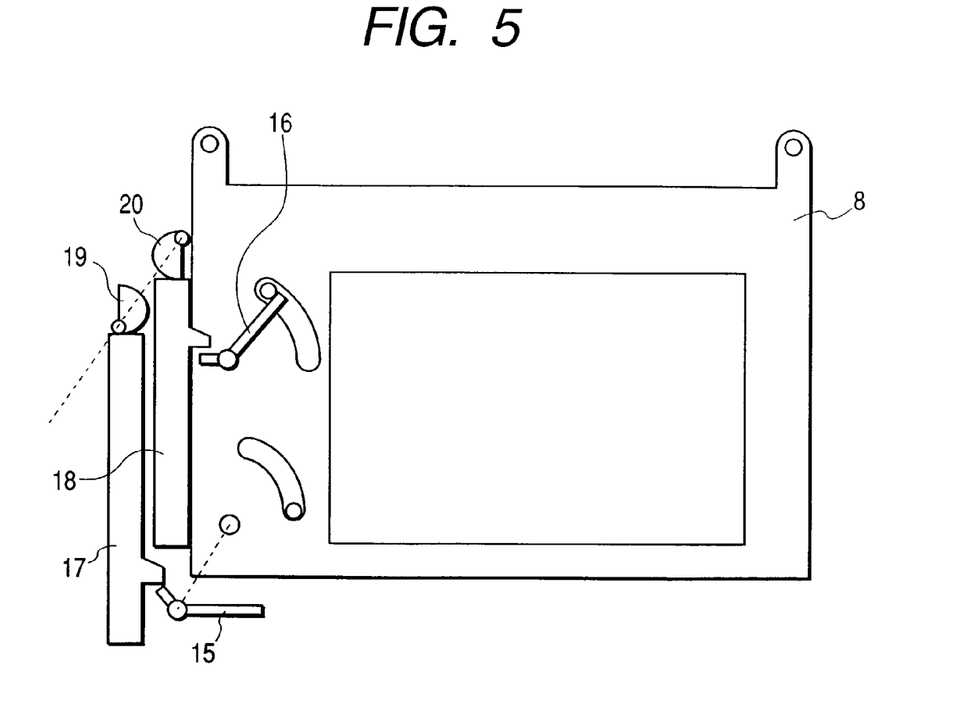
FIG. 5 is an illustration schematically showing the construction of a shutter unit 8 in FIG. 1.

FIG. 5 is an illustration schematically showing the construction of the shutter unit 8 in FIG. 1.

Referring to FIG. 5, the shutter unit 8 is provided with a leading curtain charge lever 15 for moving the shutter leading curtain 11 to its exposing position or its light-intercepting position, a leading curtain charge cam 19 for operating the leading curtain charge lever 15 through a leading curtain charge plate 17, a trailing curtain charge lever 16 for moving the shutter trailing curtain 12 to its exposing position or its light-intercepting position, and a trailing curtain charge cam 20 for operating the trailing curtain charge lever 16 through a trailing curtain charge plate 18.

The leading, curtain charge cam 19 and the trailing curtain charge cam 20 are disposed on the same shaft, but operate independently of each other. FIG. 5 shows a state in which only the shutter trailing curtain 12 is exposure-charged, that is, is in its exposing position.

Figure 6:
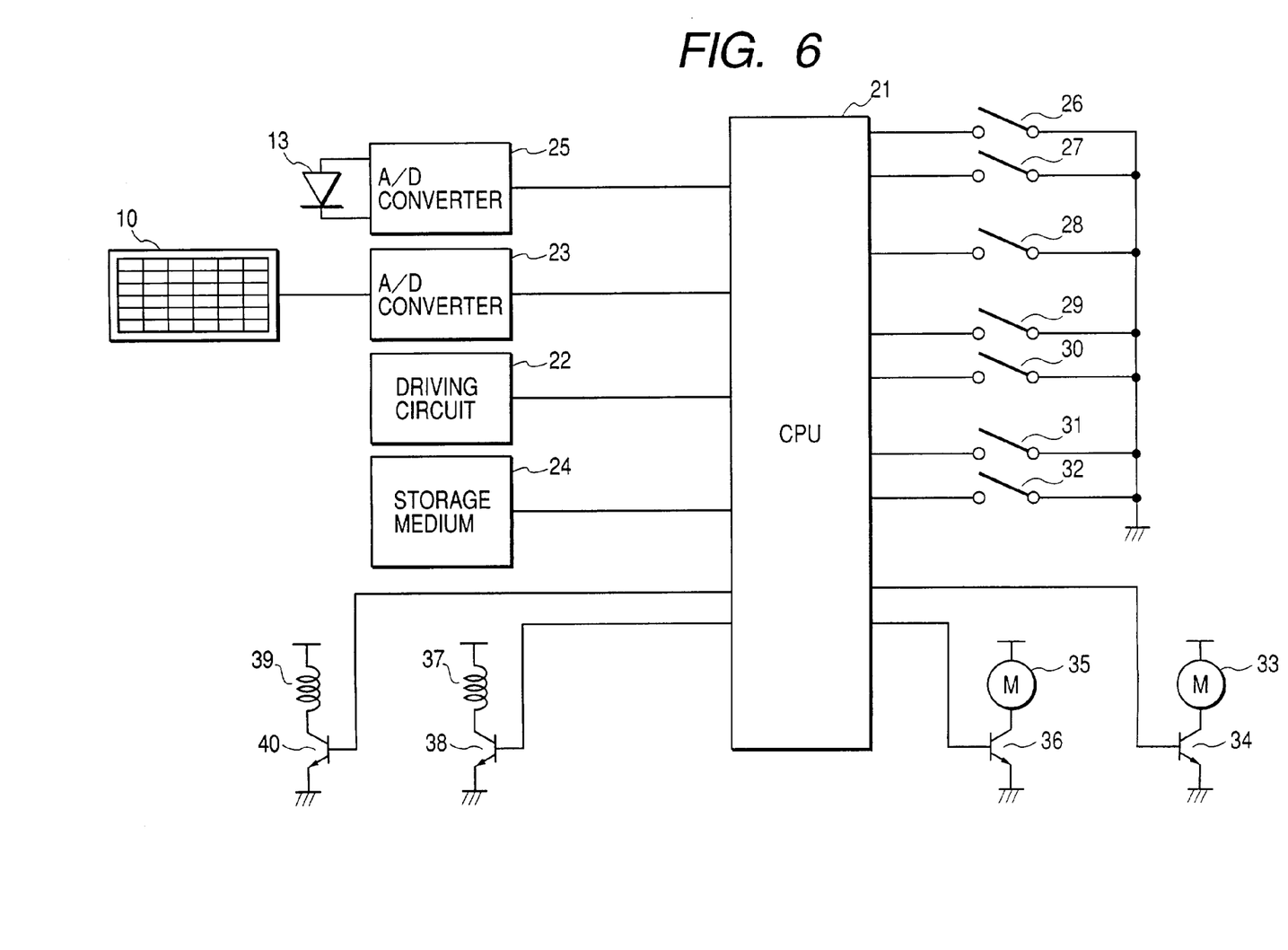
FIG. 6 is a block diagram of the electric circuit of the digital still camera of FIG. 1.

FIG. 6 is a block diagram of the electric circuit of the digital still camera of FIG. 1.

Referring to FIG. 6, the digital still camera of FIG. 1 is comprised chiefly of a CPU 21 (operating means), a stop driving circuit 22 for driving the stop 2, an A/D converter 23 for converting the voltage of the output of the image pickup device 10 into a digital signal, a storage medium 24 such as Compact Flash (R), an A/D converter 25 for photometry used in the photometric element 13, a switch 26 for discriminating whether it is ON at the first stroke of a release button, not shown, a switch 27 for discriminating whether it is ON at the second stroke of the release button, a switch 28 for discriminating which of the optical finder display mode and the electronic finder display mode has been selected, a switch 29 for discriminating whether the mirror 7 is lifted up, a switch 30 for discriminating whether the mirror 7 is lowered, a switch 31 for discriminating whether the shutter trailing curtain 12 has been charged for exposure, that is, is in its exposing position, a switch 32 for discriminating whether the shutter leading curtain 11 has been charged for light interception, that is, is in its light-intercepting position, a motor 33 for bringing the mirror 7 into one of its lifted-up state and its lowered state, a transistor 34 for driving the motor 33, a motor 35 for charging the shutter leading curtain 11 for light interception and charging the shutter trailing curtain 12 for exposure, a transistor 36 for driving the motor 35, a magnet 37 for charging the shutter leading curtain 11 for light interception, a transistor 38 for driving the magnet 37, a magnet 39 for charging the shutter trailing curtain 12 for exposure, and a transistor 40 for driving the magnet 39. These constituent elements are connected to the CPU 21. The image pickup device 10 is connected to the A/D converter 23.

Figure 7:
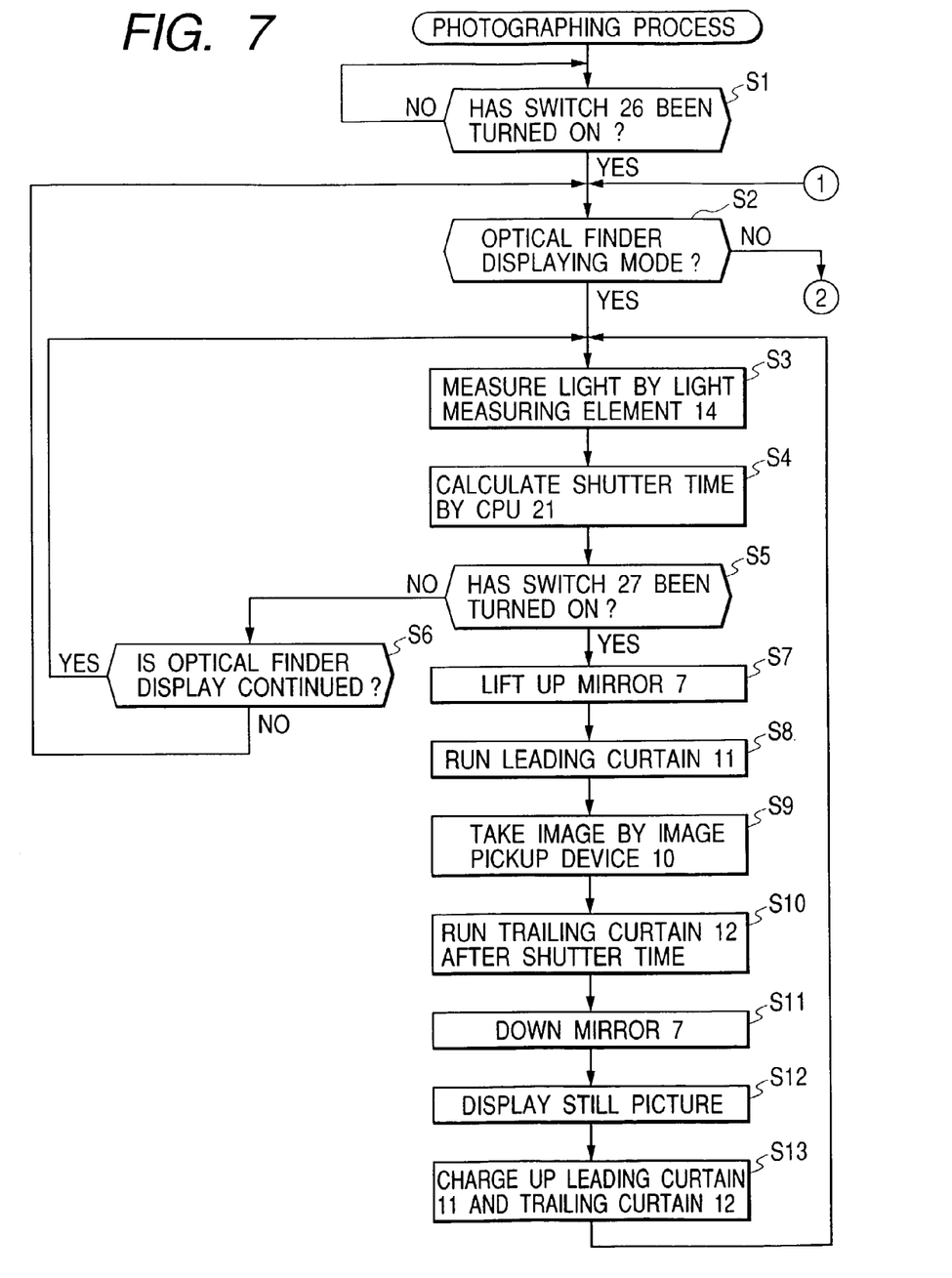
FIG. 7 is a flow chart of the photographing process by optical finder display executed by the digital still camera of FIG. 1.
Figure 8:
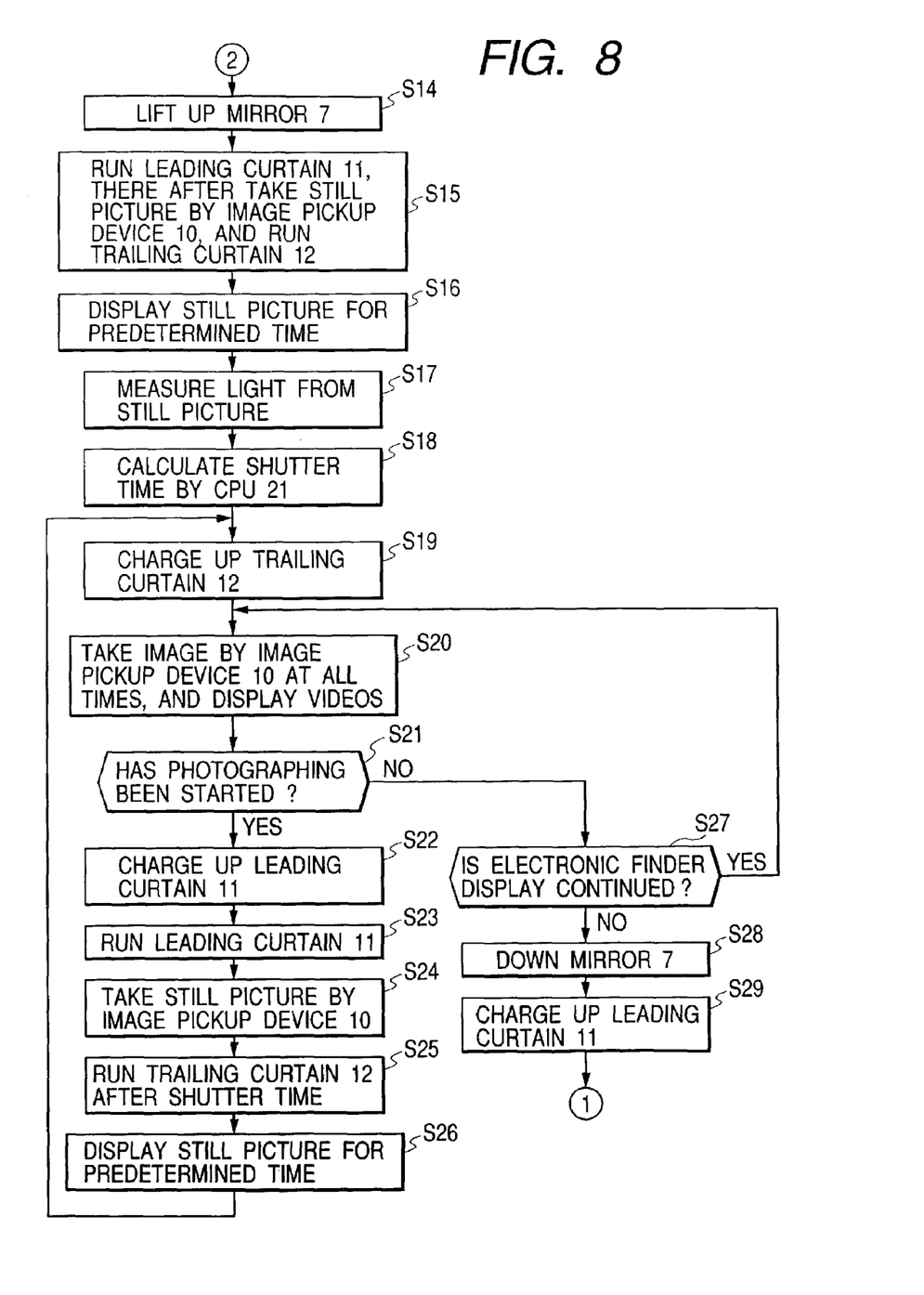
FIG. 8 is a flow chart of the photographing process by electronic finder display executed by the digital still camera of FIG. 1.

FIGS. 7 and 8 are flow charts of the photographing process executed by the digital still camera of FIG. 1.

In FIG. 7, when the switch 26 becomes ON at the first stroke of the release button (YES at a step S1), whether the mode is the optical finder display mode is discriminated by the switch 28 (step S2), and if it is the optical finder display mode, the processing of the optical finder display mode is executed by the processing of steps S3 to S13.

In the processing of the optical finder display mode, light is first measured by the light measuring element 14 (step S3), and the voltage of the output of the measured luminosity value is converted into a digital signal, and the shutter time and the aperture value of the stop 2 are calculated by the CPU 21 (step S4) (FIG. 7).

Then, whether photographing should be started is discriminated by the ON of the switch 27 by the second stroke of the release button (step S5), and if it should be started, the mirror 7 is lifted up (step S7), and at the next step S8, the shutter leading curtain 11 is run for exposure, and image pickup is effected by the image pickup device 10 (step S9)

Figure 3:
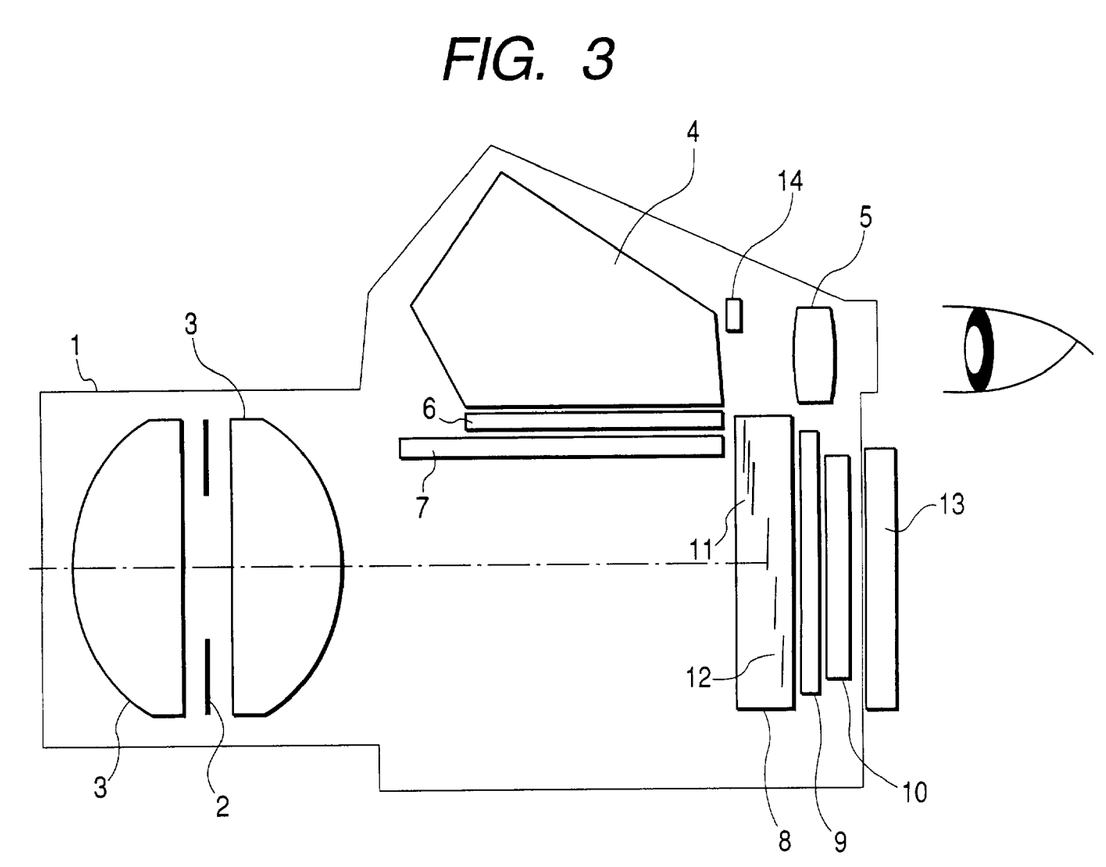
FIG. 3 is an illustration schematically showing the construction of the digital still camera of FIG. 1, and shows the case of the termination of image pickup in the optical finder display mode.

(FIG. 2), and after the shutter time, the shutter trailing curtain 12 is run for light interception and intercepts the light from the object (step S10) (FIG. 3). By the shutter trailing curtain 12 being run for light interception, smearing can be prevented.

The mirror 7 is lowered (step S11), and one photographing process is terminated. Then, the stop 2 is opened, and the image taken at the step S9 is read out, processed and recorded, and a photographed still picture is displayed on the liquid crystal monitor 13 (step S12).

Further, the shutter leading curtain 11 is charged for light interception, and the shutter trailing curtain 12 is charged for exposure (step S13), whereafter return is made to the processing after the selection of the optical finder display mode at the step S3.

When photographing is not started as the result of the discrimination at the step S5, whether the optical finder display should be continued is discriminated (step S6), and if it should be continued, the processing of the steps S3 to S5 is repeated.

Also, when in the processing of the step S13, the shutter leading curtain 11 is charged for light interception after the shutter trailing curtain 12 has been charged for exposure, image pickup is effected by the image pickup device 10 and the object image is accumulated. However, this accumulated image, unlike exposed film, poses no problem because resetting for erasing an image accumulated before the next image pickup from the image pickup device 10 is effected.

When the optical finder display is not continued as the result of the discrimination at the step S6, it is judged that the optical finder display mode has been released, and return is made to the processing of the step S2, and the subsequent processing is repeated.

When as the result of the discrimination at the step S2, the mode is not the optical finder display mode, that is, it is the electronic finder display mode, the processing of the electronic finder display mode is executed by the processing of steps S14 to S29 in FIG. 8.

In the processing of the electronic finder display mode, in FIG. 8, the mirror 7 is first lifted up (step S14), and the shutter leading curtain 11 is run for exposure, whereafter a still picture is taken by the image pickup device 10, and the shutter trailing curtain 12 is run for light interception (step S15) (FIG. 5). The image taken at the step S15 is read out, processed and recorded, and the still picture taken is displayed on the liquid crystal monitor 13 for a predetermined time (step S16). Thereby, the user can confirm a composition or the like. At this time, light is measured from this still picture (step S17), and the shutter time and the aperture value of the stop 2 are calculated by the CPU 21 (step S18).

Then, only the shutter trailing curtain is charged for exposure (step S19), and image pickup is effected at all times by the image pickup device 10, and moving images are displayed (step S20) (FIG. 4).

At the next step S21, whether photographing should be started is discriminated by the ON of the switch 27 by the second stroke of the release button, and when it should be started, the shutter leading curtain 11 is charged for light interception (step S22), and the shutter leading curtain 11 is run for exposure (step S23), and a still picture is taken by the image pickup device 10 (step S24), and after the shutter time, the shutter trailing curtain 12 is run for light interception (step S25). The image taken at the step S24 is read out, processed and recorded and the photographed still image is displayed on the liquid crystal monitor 13 for a predetermined time (step S26), and return is made to the processing of the step S19 and subsequent steps.

When photographing is not started as the result of the discrimination at the step S21, whether the electronic finder display should be continued is discriminated (step S27), and when it should be continued, the processing of the steps S20 to S21 is repeated.

When the electronic finder display is not continued as the result of the discrimination at the step S27, it is judged that the photographing mode by the electronic finder display has been released, and the mirror 7 is lowered (step S28), whereafter the shutter leading curtain 11 is charged for light interception (step S29), and return is made to the processing of the step S2 of FIG. 7, and the subsequent processing is repeated.

According to the processing of FIGS. 7 and 8, when the optical finder display mode has been selected (YES at step S2), with the mirror 7 remaining lowered so that the light from the object may be measured by the light measuring element 14, the mirror 7 is lifted up so that during the photographing by the digital still camera (steps S7 to S11), the light from the object may enter the image pickup device 10, and then in order to effect the image pickup of the object (step S9), the shutter leading curtain 11 is run for exposure and the shutter trailing curtain 12 is run for light interception, and when the electronic finder display mode has been selected (NO at step S2), the mirror 7 is lifted up so that the light from the object may enter the image pickup device 10 (step S14), whereafter only the shutter trailing curtain 12 is charged for exposure, and during the photographing by the digital still camera (steps S22 to S25), in order to effect the image pickup of the object (step S24), the shutter leading curtain 11 is charged for light interception, whereafter the shutter leading curtain 11 is run for exposure and the shutter trailing curtain 12 is run for light interception and therefore, the optical finder display and the electronic finder display can be selectively effected almost without the construction of the conventional digital still camera being changed.

Of course, the present invention can also be applied to a case where a ROM 24 storing therein the program module of software for realizing the aforedescribed embodiment is achieved by supplying the program to a system or an apparatus. In this case, the program module itself read out from the ROM 24 realizes the novel function of the present invention, and the storage medium storing the program therein constitutes the present invention.

In the above-described embodiment, the program module is stored in the ROM 24 contained in the main body of the digital still camera, and as the ROM 24 for supplying the program module, there would occur to mind various ones such as a Floppy (registered trademark) disc, a hard disc, an optical disc, a magneto-optical disc, CD-ROM, MO, CD-R, DVD, a magnetic tape, a non-volatile memory card and Compact Flash (registered trademark), but it need not be restricted to a particular one, and can be any one capable of storing the above-described program therein.

The individual components shown in a schematic or block form in the drawings are all well-known in the camera art and their specific construction and operation are not critical to the operation or best mode for carrying out the invention.

While the present invention has been described with respect to what is presently considered to be the preferred embodiment, it is to be understood that the invention is not restricted to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, in the above-described embodiment, the object light is selectively guided to the optical finder and image pickup device by the mirror, but the present invention can also be applied even if instead of the mirror, a half-mirror is used so that the object light may be guided to both of the optical finder and the image pickup device and the optical finder and the electronic finder can be used at a time.

What is claimed is:

1. An image pickup apparatus comprising:
   (A) an optical finder that optically displays an object image;
   (B) an image pickup device that receives the object image and converts the object image into an image signal for photographing;
   (C) an electronic finder that displays the object image received by said image pickup device on the basis of the image signal converted by said image pickup device;
   (D) a focal plane shutter that shields said image pickup device from light, said focal plane shutter rendering said image pickup device exposed to light so that before photographing, said image pickup device can receive the object image displayed by said electronic finder; and
   (E) a beam guide device that guides a beam from the object to said optical finder and said image pickup device, said beam guide device being capable of changing the guided state of said beam;
   wherein said focal plane shutter exposes said image pickup device to light by a leading curtain thereof after running and a trailing curtain thereof before running to thereby permit the display of the object image before photographing by said electronic finder; and
   wherein when shift is to be made from a state in which said electronic finder is displaying the object image before photographing to the photographing operation, said focal plane shatter moves said leading curtain to its state before running and shields said image pickup device from light, and thereafter runs said leading curtain and exposes said image pickup device to light and also runs said trailing curtain and shields said image pickup device from light to thereby perform the photographing operation.

2. An image pickup apparatus comprising:
   (A) an image pickup device that receives an object image and converts the object image into an image signal for photographing;
   (B) an electronic finder that displays the object image received by said image pickup device on the basis of the image signal converted by said image pickup device; and
   (C) a focal plane shutter that renders said image pickup device exposed to light by a leading curtain thereof after running and a trailing curtain thereof before running so that before photographing, said image pickup device can receive the object image displayed by said electronic finder;
   wherein when shift is to be made from a state in which said electronic finder is displaying the object image before photographing to a photographing operation, said focal plane shatter moves said leading curtain to a state before running and shields said image pickup device from light, and thereafter runs said leading curtain and exposes said image pickup device to light and also runs said trailing curtain and shields said image pickup device from light to thereby perform the photographing operation.

3. An image pickup apparatus according to claim 2, further comprising:
   a selecting device that selects display/non-display of the object image before photographing by said electronic finder;
   wherein when the non-display by said electronic finder is selected by said selecting device, said focal plane shutter moves said leading curtain to the state before running and shields said image pickup device from light.

4. A control method applied to an image pickup apparatus comprising an image pickup device that receives an object image and converts the object image into an image signal for photographing, an electronic finder that displays the object image received by said image pickup device on the basis of the image signal converted by said image pickup device, and a focal plane shutter that shields said image pickup device from light, said control method comprising:
   exposing said image pickup device to light by a leading curtain after running and a trailing curtain before running, of said focal plane shutter so that before photographing, said image pickup device can receive the object image displayed by said electronic finder, and when shift is to be made from a state in which said electronic finder is displaying the object image before photographing to a photographing operation, moving said leading curtain to a state before running and shielding said image pickup device from light, and thereafter running said leading curtain and exposing said image pickup device to light and also running said trailing curtain and shielding said image pickup device from light to thereby perform the photographing operation.

5. A control program applied to an image pickup apparatus comprising an image pickup device that receives an object image and converts the object image into an image signal for photographing, an electronic finder that displays the object image received by said image pickup device on the basis of the image signal converted by said image pickup device, and a focal plane shutter that shields said image pickup device from light, said control program including:
   exposing said image pickup device to light by a leading curtain after running and a trailing curtain before running, of said focal plane shutter so that before photographing, said image pickup device can receive the object image displayed by said electronic finder, and when shift is to be made from a state in which said electronic finder is displaying the object image before photographing to a photographing operation, moving said leading curtain to a state before running and shielding said image pickup device from light, and thereafter running said leading curtain and exposing said image pickup device to light and also running said trailing curtain and shielding said image pickup device from light to thereby perform the photographing operation.

* * * * *

UNITED STATES PATENT AND TRADEMARK OFFICE
CERTIFICATE OF CORRECTION

PATENT NO. : 7,084,920 B2
APPLICATION NO. : 10/161861
DATED : August 1, 2006
INVENTOR(S) : Ryuichi Kobayashi It is certified that error appears in the above-identified patent and that said Letters Patent is hereby corrected as shown below:

Column 7, line 40, delete "plane shatter" and insert --plane shutter--

Signed and Sealed this

Twenty-first Day of November, 2006

JON W. DUDAS
*Director of the United States Patent and Trademark Office*